Jan. 28, 1958     L. E. OBERHOLTZ     2,821,198
THRESHER HAVING REVERSIBLE TYPE CONCAVE

Filed Sept. 19, 1955

Inventor
Lester E. Oberholtz
By
Attorney

United States Patent Office 2,821,198
Patented Jan. 28, 1958

2,821,198

THRESHER HAVING REVERSIBLE TYPE CONCAVE

Lester E. Oberholtz, Kansas City, Mo., assignor to Allis-Chalmers Manufacturing Company, Milwaukee, Wis.

Application September 19, 1955, Serial No. 534,907

4 Claims. (Cl. 130—27)

This invention relates to threshing machines, and it is concerned more particularly with a threshing mechanism of the type wherein a rotary cylinder and a stationary concave cooperate with each other to remove the seed from the heads of a grain crop or the like.

Among various cylinder constructions which have heretofore been suggested and which are commonly used in threshing mechanisms of the mentioned type are the well known spike tooth cylinder and the equally well known rasp bar cylinder. The conventional concave for use with the spike tooth cylinder is so constructed that the cylinder teeth pass midway between staggered rows of stationary concave teeth, and the concave for use with the rasp bar cylnder has a number of cross bars which are secured to a stationary support and spaced from each other circumferentially of the cylinder.

Generally, it is an object of the invention to provide an improved threshing mechanism of the spike tooth cylinder type.

More specifically, it is an object of the invention to provide an improved spike tooth concave construction which will take care of certain difficulties which have heretofore been encountered with threshing mechanisms of the spike tooth cylinder type, particularly in the matter of providing a practical and economical precision mounting of the stationary concave teeth, a long service life of these teeth, and convenient servicing of the mechanism.

A further object of the invention is to provide an improved spike tooth concave construction which lends itself for use in converting a rasp bar cylinder type threshing mechanism into a spike tooth cylinder type threshing mechanism, and vice versa.

A further object of this invention is to provide a spike tooth concave composed of identical sections and wherein each section is of sufficiently small size and of sufficiently light weight to permit easy handling.

These and other objects and advantages will become apparent as the description progresses and particularly points out other features not previously mentioned.

In the drawing, in which the invention is illustrated:

Figure 1:
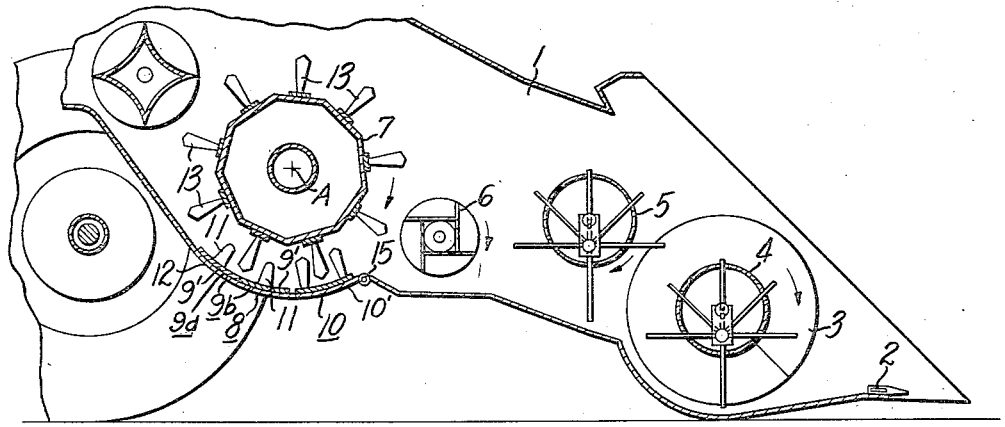
Fig. 1 is a schematic side elevation of a portion of a combine harvester embodying the invention, with the near side wall removed for exposing the cylinder and concave.

Referring to Fig. 1, it is seen that the invention is embodied in a combine harvester including a body portion 1 having a sickle bar 2 mounted on the forward end thereof. An auger conveyor 3, including a disappearing finger beater 4 of conventional construction is rotatably mounted in body portion 1 in the usual manner and operates to move the grain cut by the sickle bar 2 backward and upward into the body portion 1. A disappearing finger beater 5 is rotatably mounted in body portion 1 and positioned in coacting relation with beater 4 for moving the cut grain to another rotatably mounted beater member 6 which in turn moves the cut grain to a rotating threshing cylinder 7 coactively mounted in body portion 1 in spaced relation to a concave 8. A safety stone removing door 10 is also carried by the body portion 1, and the directions in which the auger 3, beaters 4, 5, 6, and cylinder 7 rotate in normal operation of the machine are indicated by arrows in Fig. 1.

Figure 2:
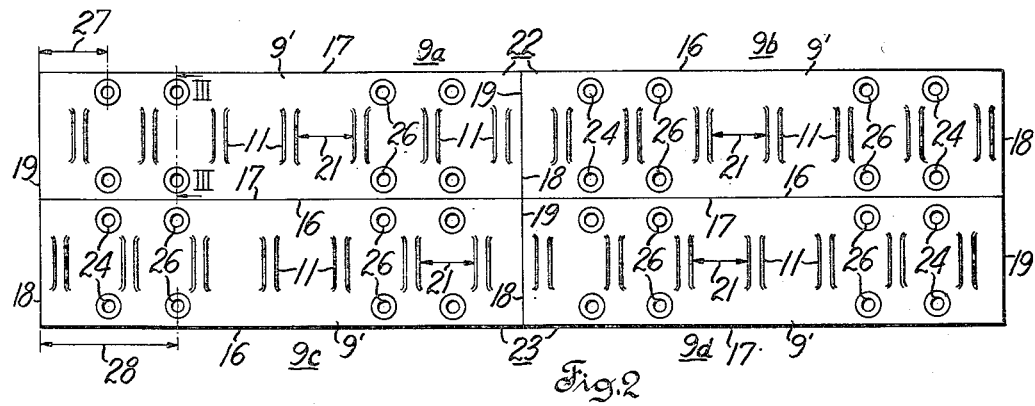
Fig. 2 is a diagrammatic view showing an enlarged development of four concave sections incorporated in the machine shown in Fig. 1.
Figure 3:
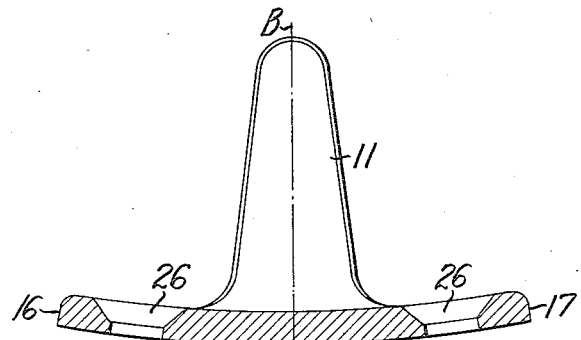
Fig. 3 is an enlarged sectional view taken on line III—III of Fig. 2.

Referring to Figs. 2 and 3, it is seen that the concave assembly 8 is made up of four identical sections $9^a$, $9^b$, $9^c$ and $9^d$, each comprising a generally rectangular, arcuate base plate 9', and a single row of spike teeth 11 integrally formed, as by casting, with the base plate 9' and projecting from the inner or concave side of the latter. As shown in Figs. 1 and 3, the outer or convex side of each base plate 9' presents an arcuate surface which extends parallel to the axis of the cylinder 7 and is curved concentrically therewith, and in the assembled condition of the mechanism as shown in Fig. 1, the arcuate outer or convex surfaces of the individual base plates 9' are in face to face engagement with a convex inner surface of a correspondingly curved plate metal wall member 12 of the body portion 1. The concave sections $9^a$, $9^b$, $9^c$ and $9^d$ are detachably secured to the wall member 12, as will be explained more full hereinbelow, and in the secured condition of the sections, the spike teeth 11 of the concave sections extend radially toward the axis of rotation A (Fig. 1) of threshing cylinder 7. The cylinder 7 is of conventional construction and is provided with spike teeth 13 mounted thereon in coacting relation with the spike teeth 11 of the concave. If desired, the spike teeth 11 could be made individually removable from the base plates 9'. However, it is preferred that the spike teeth of each section be integral with the associated base plate 9' so that absolute accurate spacing of the spike teeth 11 can be maintained to provide proper clearance between the spike teeth of the concave and the spike teeth of the cylinder.

If desired, safety door 10 (Fig. 1) could be constructed utilizing concave sections $9^a$, $9^b$, $9^c$ and $9^d$, but preferably because the teeth of safety door section 10 are the more likely to be contacted by stones, the teeth thereof are made individually removable. Safety door section 10 has a curved outer wall 10' generally concentric with the spike tooth cylinder 7 and is hinged about pivot rod 15 carried by body portion 1 so that if stones, rocks or other hard foreign materials are encountered section 10 will pivot about hinge rod 15 dropping the foreign material on the ground as is well known in the prior art.

Referring again to Fig. 2 it is seen that the base plate 9' of each concave section is generally rectangular. Each base plate is bounded by sides 16, 17 and ends 18, 19. At end 18, the adjacent spike tooth is positioned relatively close to the end of the plate whereas, at end 19 the adjacent spike tooth is positioned a greater distance away from that end. It will be noted that adjacent spike teeth are uniformly spaced or separated a distance 21 and when, as shown in Fig. 2, two of these sections are aligned with the end 18 of one section abutting the end 19 of the other section the uniform spacing of the spikes is contained. As shown in Fig. 2 the concave is made up of four sections arranged to form two rows 22 and 23 with each row containing two sections in end abutting relation and each row mounted in side abutting or circumferentially adjacent relation to the next row. The first removable sections $9^a$ and $9^b$ of row 22 are positioned in reverse order or relation to that of the second removable sections 9ᶜ and 9ᵈ of row 23 to provide a staggered relation of the spikes in row 23 to the spikes in row 22.

The spikes are generally symmetrical about their major axis B—B (Fig. 3) so that the leading and lagging portions of the spikes are configured the same so that if excess wear occurs on the leading portions of the spikes, the sections can be reversed to present the lagging unworn spike tooth portions in a leading position.

Each of the sections are provided with apertures 24 and 26 spaced from the ends of the section for receiving bolts (not shown) or the like for fastening the sections to the frame of the combine harvester 1. Each of the sections has the same number of apertures 24 and 26 and each has them in the same place. The apertures 24 being spaced a distance 27 from the adjacent end of the concave section and the apertures 26 being spaced a distance 28 from the adjacent end. It is of course apparent that the spacing of these apertures is a critical feature to provide interchangeability and reversibility.

The herein disclosed spike tooth concave construction readily lends itself for use in converting a rasp bar cylinder type threshing mechanism into a spike tooth cylinder type threshing mechanism, and vice versa. For instance, if it should be desired to convert the spike tooth cylinder type threshing mechanism shown in Fig. 1, into a rasp bar cylinder type threshing mechanism, all of the concave sections 9ᵃ, 9ᵇ, 9ᶜ and 9ᵈ may be readily removed from the arcuate plate metal wall member 12, and a rasp bar type cylinder may be substituted for the spike tooth type cylinder 7. The necessary cross bars for cooperation with the rasp bar cylinder may readily be mounted on the plate metal wall member 12 by means of conventional fastening means, not shown. In a similar manner, a rasp bar cylinder type threshing mechanism of conventional construction including the arcuate plate metal wall member 12, may readily be converted into a spike tooth cylinder type threshing mechanism by substituting a spike tooth cylinder for the rasp bar cylinder and by installing concave sections 9ᵃ, 9ᵇ, 9ᶜ and 9ᵈ in lieu of the conventional concave cross bars of the rasp bar cylinder type threshing mechanism.

While no drive means have been shown for the various moving parts of the machine, it will be apparent to persons skilled in the art that suitable drive means may be provided for the various beaters, sickle bar and cylinder. And while a concave made up of four sections has been shown for purposes of illustration, it is possible to use as many rows as desired as determined by the crop and other conditions. If desired each row could be made up of three sections. It has been found that by making each row of two sections each section is of a size and weight that can be conveniently handled.

Further modifications will be apparent to those skilled in the art and it is desired, therefore, that the invention be limited only by the scope of the appended claims.

It is claimed and desired to secure by Letters Patent:

1. In combination, in a harvester having a concave positioned in coacting relation to a rotatable spike toothed threshing cylinder, said concave comprising a plurality of identical removable sections; each of said sections including a base plate, spikes extending from said base plate generally toward the axis of rotation of said cylinder, each of said concave spikes being uniformly spaced from adjacent spikes, said section having one end spike tooth positioned a greater distance from one end than the other end spike tooth is positioned from the other end; said concave including first removable sections mounted with one end of one section abutting said other end of another section in extension forming relation, and second removable sections mounted in reversed side abutting relation with respect to said first sections with the spikes of said first sections being in staggered relation in the direction of rotation to the spikes of said second sections for permitting the spikes of said cylinder to pass closely adjacent between said staggered spikes.

2. A concave as recited in claim 1 and wherein said concave spikes being of symmetrical cross section in fore and aft directions relative to their radial axis whereby said sections can be reversed when one side of said spikes becomes worn.

3. A concave section as recited in claim 1 wherein means are provided for attaching said section to said harvester in coacting relation to said cylinder, said means comprising apertures uniformly spaced from the ends of said section for receiving bolts for attaching said section to said harvester.

4. In a threshing mechanism of the rotary cylinder and coacting concave type, the combination of a support, a concave assembly mounted on said support and comprising at least two identical reversable sections removably mounted in circumferentially adjacent relation to each other; each of said sections including a base plate, spikes extending from said base plate generally toward the axis of rotation of said cylinder with each of said concave spikes being uniformly spaced from adjacent spikes and each having leading and lagging portions, each section having one end spike tooth positioned a greater distance from one end than the distance the other end spike tooth is positioned from the other end of said section; each of said reversable sections of said concave assembly detachably mounted on said support in reverse relation to circumferentially adjacent concave sections so that the spike teeth of one section are in staggered relation to the spike teeth of adjacent sections for permitting the spikes of said cylinder to pass closely adjacent between said staggered spikes, and wherein any section may be reversed and interchanged with any adjacent section to maintain said staggered relation and to present said lagging spike tooth portions in a leading position.

References Cited in the file of this patent

UNITED STATES PATENTS

| | | |
|---|---|---|
| 31,389 | Hunsicker | Feb. 12, 1861 |
| 400,217 | Johnston | Mar. 26, 1889 |
| 1,992,172 | Anderson | Feb. 26, 1935 |

FOREIGN PATENTS

| | | |
|---|---|---|
| 481,226 | Italy | May 26, 1953 |

U. S. DEPARTMENT OF COMMERCE
PATENT OFFICE

CERTIFICATE OF CORRECTION

Patent No. 2,821,198                                               January 28, 1958

Lester E. Oberholtz

It is hereby certified that error appears in the printed specification of the above numbered patent requiring correction and that the said Letters Patent should read as corrected below.

Column 4, line 9, after "with" insert -- said --; line 42, for "reverse" read -- reversed --.

Signed and sealed this 22nd day of April 1958.

(SEAL)
Attest:
KARL H. AXLINE                                                ROBERT C. WATSON
Attesting Officer                                          Commissioner of Patents